United States Patent [19]

Motomura et al.

[11] Patent Number: 4,515,197
[45] Date of Patent: May 7, 1985

[54] HEAVY DUTY PNEUMATIC RADIAL TIRE

[75] Inventors: Kenichi Motomura; Hiroshi Ogawa, both of Higashiyamato; Akira Yamamoto, Sayama; Noriyuki Hagita, Kuroiso, all of Japan

[73] Assignee: Bridgestone Tire Company Limited, Tokyo, Japan

[21] Appl. No.: 491,488

[22] Filed: May 4, 1983

[30] Foreign Application Priority Data

May 12, 1982 [JP] Japan .................................. 57-78123

[51] Int. Cl.³ ........................ B60C 11/06; B60C 11/12
[52] U.S. Cl. ............................ 152/209 R; 152/DIG. 4
[58] Field of Search .......... 152/209 R, 209 A, 209 B, 152/209 WT, 209 NT, 209 D, DIG. 4

[56] References Cited

U.S. PATENT DOCUMENTS

| 3,584,670 | 6/1971 | Verdier | 152/209 R |
| 3,848,651 | 11/1974 | French | 152/209 R |
| 3,954,130 | 5/1976 | Verdier | 152/209 R |
| 4,177,850 | 12/1979 | Ogawa et al. | 152/209 R |
| 4,217,942 | 8/1980 | Takigawa | 152/209 D |
| 4,258,769 | 3/1981 | Makino et al. | 152/209 R |

FOREIGN PATENT DOCUMENTS

| 1621801 | 3/1951 | Fed. Rep. of Germany | ... 152/209 R |
| 1920216 | 11/1969 | Fed. Rep. of Germany | ... 152/209 R |
| 2129403 | 12/1971 | Fed. Rep. of Germany | ... 152/209 R |

Primary Examiner—Lois E. Boland
Attorney, Agent, or Firm—Sughrue, Mion, Zinn, Macpeak, and Seas

[57] ABSTRACT

A novel tread pattern is disclosed, which can give high performances on wet road at both the straight running and the cornering under a low load, particularly no load, to a heavy duty pneumatic radial tire without sacrificing the performances on wet road under normal load. The tread pattern comprises at least 4 lands defined by at least 3 main grooves, wherein a pair of first group lands arranged on the outermost side regions of the tread have substantially continuous along the the circumferential direction of the tread and the remaining lands located between the first group lands have notches arranged thereon in their lateral direction.

13 Claims, 24 Drawing Figures

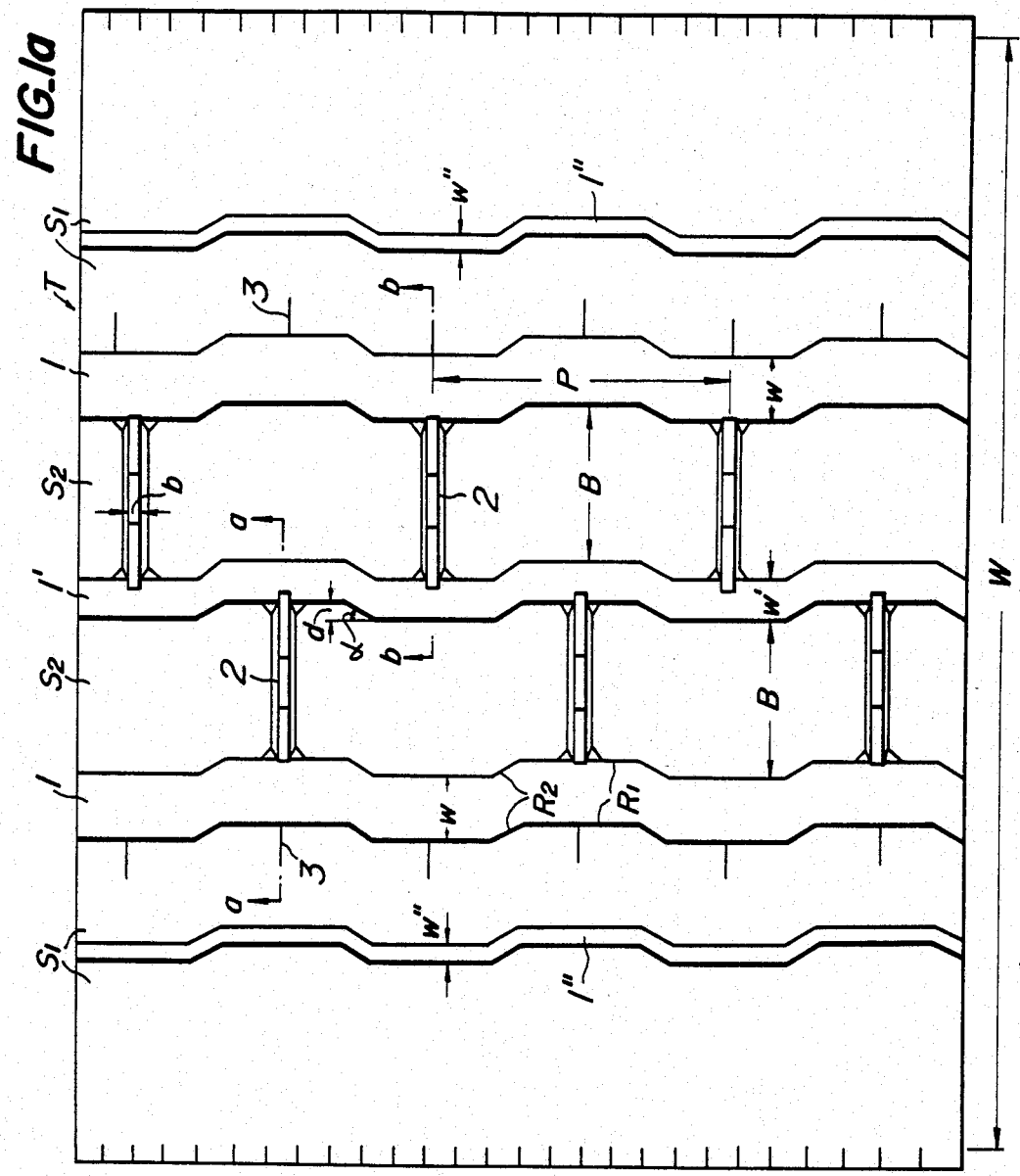

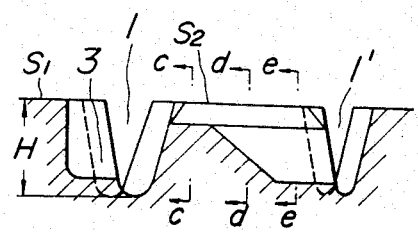
FIG_1b
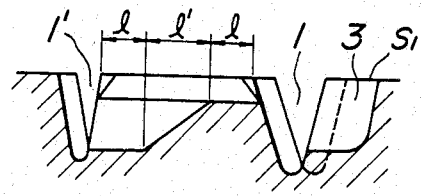
FIG_1c
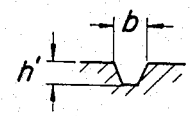
FIG_1d
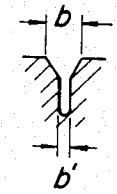
FIG_1e
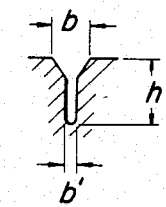
FIG_1f

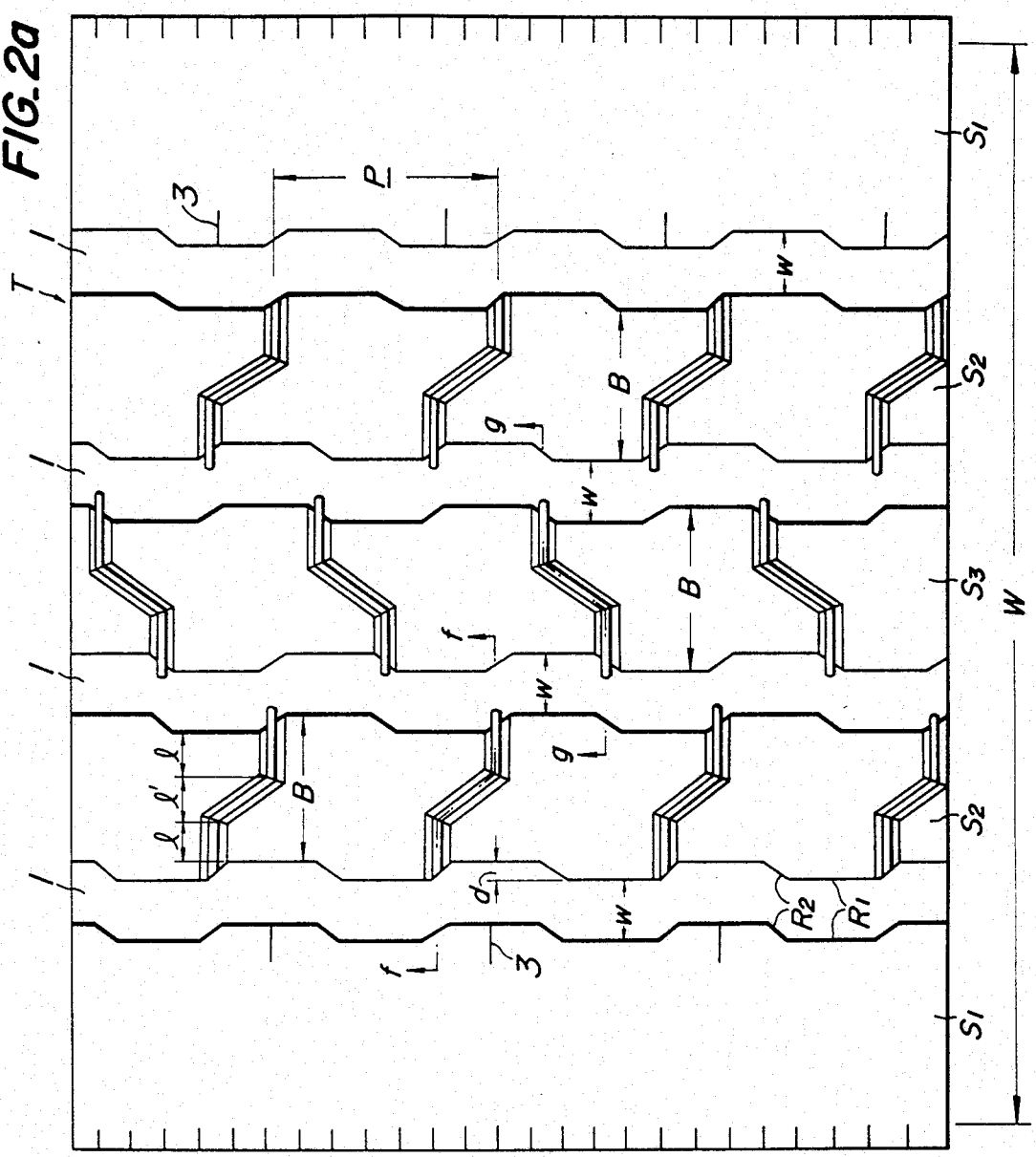

FIG_2b
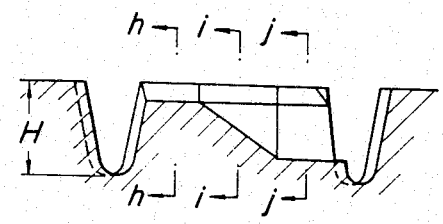
FIG_2c
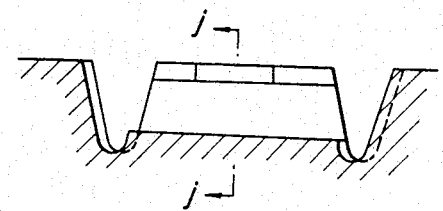
FIG_2d    FIG_2e    FIG_2f
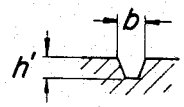  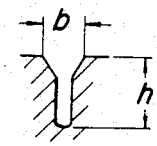

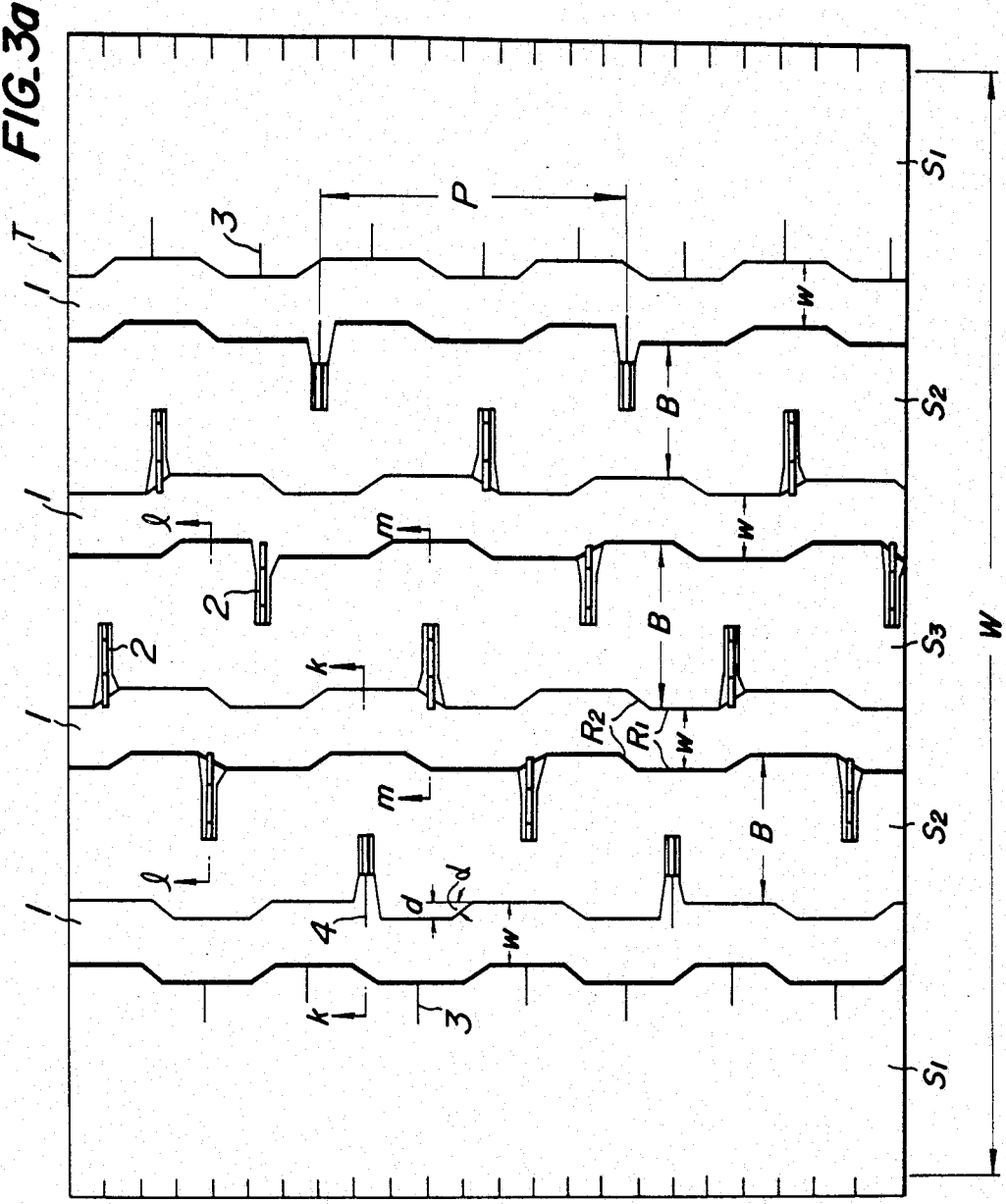

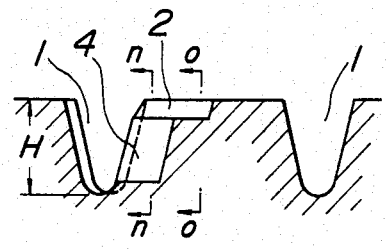
FIG_3b
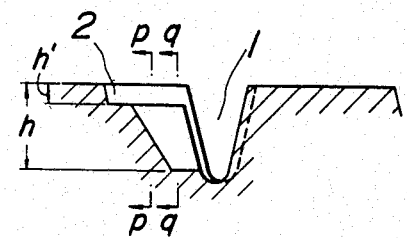
FIG_3c
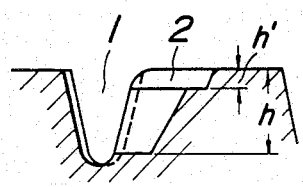
FIG_3d
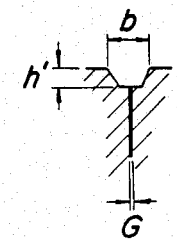
FIG_3e
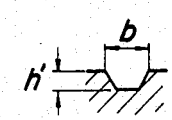
FIG_3f
FIG_3g
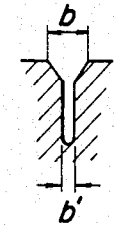
FIG_3h

HEAVY DUTY PNEUMATIC RADIAL TIRE

BACKGROUND OF THE INVENTION

1. Field of the Invention

The present invention relates to a heavy duty pneumatic radial tire, particularly to an improvement of stability in the running operation, particularly in the braking operation of a heavy duty pneumatic radial tire by improving performance of the tire on wet road, particularly resistance against both the lateral sliding due to skid and the slip.

2. Description of the Prior Art

Heavy duty pneumatic radial tires are generally fitted to trucks or buses, and used. When these tires are used, there is a great difference in the wheel load between the laden running, wherein a given amount of load is imposed to a car, and the unladen running, wherein the car is empty, and the ground-contact area in the unladen running is about one-half of the ground-contact area in the laden running.

The performances on wet road of these tires, which are demanded to these tires for the purpose of stable running of vehicles, are highly influenced by the kind of tread patterns. Merits and demerits of commonly known tread patterns are as follows.

Rib type pattern:
  Ground-contact area of a tire is very small in the empty car as described above, and therefore the traction of the tire having the pattern of this type in the empty car is poor, but the tire of this type has excellent resistance against lateral sliding even in an empty car in the cornering test.

Block type pattern:
  In the tire having a block type pattern, the traction does not substantially decrease even in an empty car contrary to the tire having a rib type pattern, but in the tire having a block type pattern, the resistance against lateral sliding at the cornering under unloaded condition is considerably lower than that under loaded condition.

Lug type pattern:
  Lug type pattern is inferior to the above described rib type pattern and block type pattern in both the lateral sliding resistance at the cornering and the traction at the straight running, particularly in the empty car.

Rib-block composite type pattern, such as side rib-center block:
  This pattern has merely a compromised property of both the patterns, and can not improve satisfactorily the performances aimed in the present invention.

The inventors have made repeatedly a large number of experiments with respect to the ground-contacting behavior of a heavy duty pneumatic radial tire under loaded and unloaded conditions. As the a result, the inventors have found that, in the heavy duty pneumatic radial tire, the ground-contact area is very small in an empty car, and only the center portion of the tread acts on traction, and the tire is apt to slip at braking and skid to lose the cornering stability of the tire and to cause the lateral sliding of the tire; and that lands located at both side region, particularly the edge portion of the lands, have a high influence upon the lateral sliding even in the above described decreased ground-contact area.

The inventors have further studied based on the above described discovery, in order to overcome the drawbacks of the above described rib type tread pattern by forming a tread pattern that has a high contribution to skid resistance at both side regions of the tread and can obtain a satisfactorily high traction at the center region of the tread even under a local ground-contact at the tread center region to cause hardly slip. As the result, the inventors have proposed a tread pattern having the following arrangement, and attained advantageously the object of the present invention.

SUMMARY OF THE INVENTION

The feature of the present invention is the provision of a heavy duty pneumatic radial tire, comprising a body reinforcement consisting of a carcass and a belt, an outer rubber layer covering the body reinforcement, and a tread formed by covering the crown portion of the body reinforcement by the outer rubber layer; said carcass consisting of at least one rubberized cord layer having tire cords arranged therein in the substantial radial plane of the tire; said belt consisting of at least two rubberized metal cord layers arranged on the outer side of the carcass such that the metal cords in the adjacent cord layers are crossed with each other at a relatively small inclined angle with respect to the equatorial line of the tire; said tread having at least four lands formed thereon and separated from each other by at least three main grooves extending continuously in zigzag form along the circumferential direction of the tread, each groove having a width of 3-10% based on the width of the tread; and said at least four lands having a pair of first group lands which are formed at the outermost sides of the tread and are substantially continuous along the circumferential direction of the tire; an improvement comprising notches being arranged at least at the edge portions of the lands which edge portions are other than those adjacent to the main grooves defining the above described first group lands, and being opened to the main grooves in an opening width of 0.5-4% in each notch based on the width of the tread such that the land near the center portion of the tread has a shear resistance in circumferential and axial directions less than that of the land near the side portion of the tread, and that each of a pair of second group lands arranged adjacent to and at the inner side of the main grooves defining the above described first group lands is softer at the inner portion thereof than at the outer portion thereof.

BRIEF DESCRIPTION OF THE DRAWINGS

FIG. 1a is a development of a part of one embodiment of the tread according to the present invention;

FIGS. 1b and 1c are cross-sectional views of the tread illustrated in FIG. 1a taken on lines a—a and b—b of FIG. 1a in the arrow direction, respectively;

FIGS. 1d, 1e and 1f are cross-sectional views of the tread illustrated in FIG. 1a taken on lines c—c, d—d and e—e of FIG. 1b in the arrow direction, respectively;

FIG. 2a is a development of a part of another embodiment of the tread according to the present invention;

FIGS. 2b and 2c are cross-sectional views of the tread illustrated in FIG. 2a taken on lines f—f and g—g of FIG. 2a in the arrow direction, respectively;

FIGS. 2d 2e and 2f are cross-sectional views of the tread illustrated in FIG. 2b taken on lines h—h, i—i and j—j of FIG. 2b (j—j of FIG. 2c) in the arrow direction, respectively;

FIG. 3a is a development of a part of a further embodiment of the tread according to the present invention;

FIGS. 3b, 3c and 3d are cross-sectional views of the tread illustrated in FIG. 3a taken on lines k—k, l—l and m—m of FIG. 3a in the arrow direction, respectively;

FIGS. 3e, 3f, 3g and 3h are cross-sectional views of the tread illustrated in FIG. 3a taken on lines n—n and o—o of FIG. 3b, and lines p—p and q—q of FIG. 3c in the arrow direction, respectively.

DESCRIPTION OF THE PREFERRED EMBODIMENT

Figure 4A:
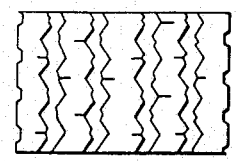
FIGS. 4a, 4b, 4c and 4d are developments of comparative treads illustrating conventional tread patterns.

The tread pattern of the present invention has preferably the following arrangements that the notch, which is arranged on the second group land and is opened to the main groove adjacent to the and at inner side of the second group land, is increased in its depth from the center portion towards the edge portion of the land and is opened to the main groove; that each of main grooves which define lands extends in such a zigzag form that the groove edge consists of circumferentially directed edge portions, which extends substantially parallel to the equatorial line of the tire in the total length of at least 50%, preferably 70–90%, based on the circumferential length of the tread, connected with each other through inclined groove edge portions, which form an angle of 30°–80° with the equatorial line of the tread, and that the adjacent circumferentially directed groove edge portions connected through the inclined groove edge portion are distant from each other in the axial direction of the tire by a distance of 0.5–5%, preferably 1–3%, based on the width of the tread; that the width of the main groove is 3.5–8% based on the width of the tread; that the notch has edges inclined outwardly towards the tread surface; that the opening width of the outwardly inclined edges of the notch at the tread surface is 0.7–3% based on the tread width, that the notch has an opening width of 0.5–2%, based on the tread width, at the portion other than the outwardly inclined edge portion; that the notches are zigzag arranged between adjacent lands separated from each other by a main groove, are straight grooves extending transversely across a land, are zigzag arranged with respect to the bisector of a land, are independently arranged on both sides of the bisector of a land, are formed of discontinuously connected straight line grooves each consisting of a groove which intersects obliquely the bisector, and grooves arranged on both sides of the oblique groove; that the first group lands have an auxiliary circumferential groove, which is far smaller in the width than the main groove and is substantially closed at the ground-contact region when the tire is rotated under load; and the like.

Radial tires generally have a body reinforcement consisting of a carcass and a belt, which carcass consists of at least one rubberized cord layer having metal cords or organic fiber cords such as nylon, polyester, Kevlar arranged therein in the substantial radial plane of the tire, and which belt consists of at least two rubberized metal cord layers arranged on the outer side of the carcass such that the metal cords arranged in the adjacent cord layers are crossed with each other at a relatively small angle with respect to the equatorial line of the tire. This radial tire exhibits very high durable life in use for a long period of time on the recently developed network of roads, particularly highways, and is recently used in an increasing amount as a tire for truck and bus. The radial tire is generally used under an internal pressure of as high as 7.25 kg/cm$^2$ in order to support a particularly high wheel load. The present invention aims to solve a problem peculiar to the difference in the ground-contact behavior between loaded condition and unloaded condition of the radial tire having the above described body reinforcement and used under such high internal pressure. Accordingly, it is a premise that the tire to be used in the present invention has the above described body reinforcement.

The body reinforcement is covered with an outer rubber layer and forms a tread at the crown portion of the body reinforcement, and various tread patterns are formed by changing the arrangement of the grooves to be formed on the tread. Conventional tread patterns have still various drawbacks as described above. The present invention provides essentially an improved rib type tread pattern, which has at least 4 lands separated from each other by at least 3 main grooves, each having a width of 3.0–10% based on the width of the tread.

In the present invention, in order to increase gradually the shear resistance of the tread from its center portion to its outer portion as a whole, notches are arranged on the lands in an average depth, which decreases from the tread center to both the side regions of the tread, and are opened to the groove edges which define the lands. In this case, the notches are not arranged at the outer edge (edge located at a farther side from the tread center) and may not be arranged at the inner edge (edge located at a nearer side to the tread center) of the main grooves defining a pair of lands located at the outermost side of the tread. As a result, at least a pair of the lands arranged on both side regions of the tread have substantially continuous rigidity along the circumferential line of the tread, and the rigidity is at a maximum value at both side regions of the tread and is a minimum value at the tread center region, whereby the present invention has succeeded in developing fully the merit and performance of the rib type pattern by a pair of lands formed on both side regions of the tread, and at the same time succeeded in improving remarkably the traction performance by the lands formed at the tread center region.

It is necessary that notches arranged on the land have an opening width of 0.5–4%, preferably 0.7–3%, based on the width of the tread in order to improve the traction performance of the tire. When the opening width is less than 0.5%, the notch is closed when the tire is turned and the tread contacts the ground, and the notch sometimes does not contribute to the imrpovement of traction performance. When the opening width exceeds 4%, irregular wear, such as heel and tow wear, may occur.

The embodiments of the tread pattern of the present invention will be explained in more detail referring to FIG. 1a–FIG. 3h. In the embodiments, the tread patterns are formed on the tread of 10.00R 20 14PR size tire for truck and bus. The tire is the same as conventional tires in the body reinforcement and other structures, and therefore the body reinforcement and other structures are not shown in the drawings.

FIGS. 1a–1f illustrate a tread pattern having 3 main grooves and 4 rows of lands, 2 rows of which are arranged on the tread center and have groove-shaped transversal notches arranged on the land. FIGS. 2a–2f and 3a–3h illustrate the arrangement of notches in a tread pattern having 4 main grooves and 5 rows of lands, one of which is arranged on the tread center and two of which are arranged on both sides thereof. The tread pattern of FIGS. 2a-2f and that of FIGS. 3a-3h are same with each other in the arrangement of main grooves and lands, but are different from each other in the arrangement of notches formed on the lands. In FIGS. 1a-3h, the numeral 1 represents a main groove, the numeral 2 represents a notch, the numeral 3 represents a sipe, the reference T represents a tread, the reference $S_1$ represents a first group land separated by a main groove 1 and formed at both side regions of the tread T, and the reference $S_2$ represents a second group land formed at a position near the tread center. In FIGS. 2a and 3a, the reference $S_3$ represents a third group land formed on the tread center.

In the tire shown in the embodiment and having the above described tire size, the width W of the tread T is 200 mm, the width w of the main groove 1 is 0.055W, and the depth H of the main groove 1 is 14.5 mm. The main groove 1 has such a V-shaped cross-sectional shape that the bottom is round and the angle formed by the groove edges is 20° or 10°.

The tread pattern illustrated in FIGS. 1a-1f has a center main groove 1' having a little smaller width w' of 0.035W, and further has auxiliary circumferential grooves 1", each of which has a small width w" of 0.015W and divides each of a pair of the first group lands $S_1$ and $S_1$, said lands $S_1$ and $S_1$ being arranged on both side regions of the tread, into two lands $S_1'$ and $S_1'$. These grooves extending along the circumference of the tread are uniformly and regularly indented in the width direction of the tread and define and form the above described lands by their edges. Each of these grooves extends along the circumference of the tread in such a zigzag form that the groove consists of circumferentially directed portions $R_1$ connected with each other through inclined portions $R_2$ which form an angle $\alpha$ of 50° with the equatorial line of the tread, the length of the circumferentially directed portions $R_1$ being 0.090W in each and being 78% in total based on the total length of the groove, and that the adjacent circumferentially directed portions $R_1$ connected through the inclined portion $R_2$ are distant from each other by a distance d of 0.015W in the width direction of the tread T.

A pair of the first group lands $S_1$ and S, arranged at both the side regions of the tread T have sipes 3 formed on the groove edge, which is opposed to the second group lands $S_2$ and $S_2$ located at a position near the tread center, in substantially the same interval on the circumference of the tread. Accordingly, the first group lands are substantially continuous in the rigidity along the circumferential direction of the tread.

On the contrary, the second group lands $S_2$ and $S_2$ located at a position near the tread center have substantially a block arrangement, wherein blocks having a lateral width B of about 0.13W are zigzag arranged under a pitch of about 1.9 times the lateral width of the block. FIGS. 1b and 1c are cross-sectional views of the tread illustrated in FIG. 1a taken on lines a—a and b—b respectively of FIG. 1a in the arrow direction and illustrate notches 2 defining the blocks. As illustrated in FIGS. 1b and 1c, the notch 2 consists of a straight groove having a depth gradually decreasing from the tread center side to the outer side. So that, each of the second group lands is softer at the axially inner side portion thereof than the axially outer side portion thereof. FIGS. 1d, 1e and 1f are cross-sectional views of the tread illustrated in FIG. 1a on lines c—c, d—d and e—e respectively of FIG. 1b in the arrow direction. As illustrated in FIGS. 1d, 1e and 1f, the notch 2 is opened to the tread surface in an opening width b of 0.018W, and has a maximum depth h of 0.79H and a minimum depth h' of 0.21H wherein H represents the depth of the main groove. Further, the maximum depth h portion and the minimum depth h' portion have a length l of 0.4W, and an intermediate inclined groove bottom portion formed between the maximum and minimum depth portions has a length l' of 0.5W. These maximum depth portion and intermediate inclined depth portion have a narrow width b' of 0.015W at a position deeper than the position corresponding to the minimum depth h', and further have outwardly inclined edges which are opened to the tread surface together with edges of the minimum depth h' portion.

FIG. 2a illustrates a part of another embodiment of the tire tread T according to the present invention. FIGS. 2b and 2c are cross-sectional views of the tread illustrated in FIG. 2a taken on lines f—f and g—g of FIG. 2a in the arrow direction, respectively. FIGS. 2d, 2e and 2f are cross-sectional views of the tread illustrated in FIG. 2a taken on lines h—h, i—i and j—j of FIG. 2b in the arrow direction, respectively. The tread T illustrated in FIGS. 2a-2f has four main grooves, which separate the tread surface such that a pair of lands $S_1$ and $S_1$, which have substantially continuous rigidity along the circumferential line of the tire, are formed at both the side regions of the tread T, and further three rows of block-shaped lands $S_2$, $S_3$ and $S_2$ are formed between a pair of the lands $S_1$ and $S_1$. FIG. 3a illustrate a further embodiment of the tire tread T according to the present invention. FIGS. 3b, 3c and 3d are cross-sectional views of the tread illustrated in FIG. 3a taken on lines k—k, l—l and m—m of FIG. 3a in the arrow direction, respectively. FIGS. 3e, 3f, 3g and 3h are cross-sectional views of the tread illustrated in FIG. 3a taken lines n—n and o—o of FIG. 3b, and on lines p—p and q—q of FIG. 3c in the arrow direction, respectively. The tread T illustrated in FIGS. 3a-3h is similar to that illustrated in FIGS. 2a-2f in the arrangement of four main grooves 1 and five rows of lands $S_1$, $S_2$, $S_3$, $S_2$ and $S_1$, but they are different from each other in the point that the former tread has groove-shaped notches extending in the form of discontinuously connected straight lines between the main grooves 1 and 1 formed on both sides of the land $S_2$ and $S_3$, but the latter tread has groove-shaped notches 2, which are arranged in zigzag form in the land $S_2$ or $S_3$ and are independently opened to one of the main grooves 1 and 1 arranged on both sides of the lands $S_2$ or $S_3$.

In the treads illustrated in FIGS. 2a-2f and FIGS. 3a-3h, the width w of the main groove 1 is 0.055 W which is the same as that of the main groove 1 in the tread illustrated in FIGS. 1a-1f. However, in the tread illustrated in FIGS. 2a-2f, each of the circumferentially directed portions $R_1$ of the main groove 1 has a length of 0.075W, and the total length of the circumferentially directed portions $R_1$ are 75% based on the circumferential length of the tread. While, in the tread illustrated in FIGS. 3a-3h, each of the circumferentially directed portions $R_1$ of the main groove 1 has a length of 0.075W similarly to the tread illustrated in FIGS. 2a-2f, but the total length of the circumferentially directed portions $R_1$ are 79% based on the circumferential length of the tread. In the treads illustrated in FIGS. 2a-2f and 3a-3h, the main groove 1 has inclined portions $R_2$ which form an angle of 45° with the equatorial line of the tread, and the circumferentially directed portion $R_1$ are connected with each other through the inclined portions $R_2$ in zigzag form such that the adjacent circumferentially directed portions $R_1$ are distant from each other at a distance d of 0.013W in the width direction of the tread T. The edges of the main groove 1 are outwardly inclined so as to form an angle of 10° between them.

The notch 2 is opened to the tread surface at an opening width of 0.015W. In the treads illustrated in FIGS. 2a–2f and in FIGS. 3a–3h, the rows of lands having a lateral width B of 0.125W are arranged at a pitch P of 1.6 times or 2.3 times the lateral width B respectively along the circumferential line of the tread.

The notch 2 of the tread illustrated in FIGS. 2a–2f consists of three discontinuously connected straight line-like grooves having lengths l of 0.035W, l' of 0.03W and l of 0.035W in the width direction of the tread T as illustrated in FIG. 2a. The notch 2 formed in the land $S_2$ and $S_2$ has a maximum depth h at the center side of the tread and a minimum depth h' at the outer side of the tread, and has a stepwisely decreasing depth from the maximum depth h to the minimum depth h'. The notch 2 formed in the land $S_3$ located at the tread center consists of grooves having a maximum depth h. The depths h and h' are 0.79H and 0.21H, respectively, similarly to the tread illustrated in FIGS. 1a–1f. Further, the grooves of the notch have a narrow width of 0.013W at the maximum depth portion and at the portion having an inclined groove bottom, which extends from the maximum depth portion to the minimum depth portion. The upper portion of these notch grooves having the maximum depth and the inclined depth has outwardly inclined edges which are opened to the tread surface together with the edges of the notch groove having a minimum depth h'.

In the tread illustrated in FIGS. 3a–3h, as seen from the cross-sectional views shown in FIGS. 3b and 3e, a very thin sipe 4 having a width of 0.035 times the depth H of the main groove is formed on the bottom of the groove of the notch 2 having a small depth h', which notch 2 has been formed on the edge portion of the lands $S_2$ and $S_2$ opposed to a pair of the lands $S_1$ and $S_1$ arranged on both the outer side regions of the tread, so as to divide the bottom of the groove of the notch 2 into two parts up to the depth h, and further notch grooves having a stepwise decreasing depth from the maximum depth h to the minimum depth h' and having the same shape as already described, are arranged on both the edge portions of the land $S_3$ occupying the tread center portion, and on both groove edge portions, each opposed to the land $S_3$, of each of the lands $S_2$ and $S_2$ so as to reach substantially the center of the width of each of the lands. In the above described notch illustrated in FIGS. 3a–3h, the depth h is 0.79H and the depth h' is 0.21H.

In the tires having the above described tread patterns, the rigidity is substantially continuous on both side regions of the tread along the circumferential direction of the tire, and the lands on the tread as a whole have gradually increasing shear resistance from the tread center to both the outer side regions of the tread.

Figure 4B:
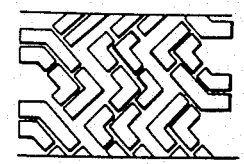
Figure 4C:
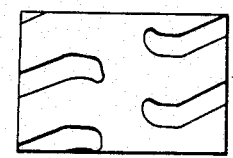
Figure 4D:
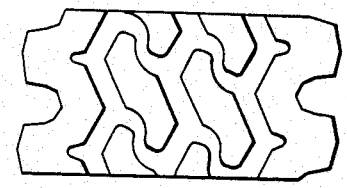

Sample tires having the above described tread patterns of the present invention were compared with comparative tires, which were same in the dimension as the sample tires of the present invention but were different therefrom only in the tread pattern as illustrated in FIGS. 4a–4d.

In the comparison, the following tests were carried out.

(a) Test condition:
Rim: 700T
Internal pressure: 7.25 kgf/cm$^2$
Load:
  2 levels
  JIS, about 50% load=1,200 kg
  JIS, about 100% load=2,425 kg (b) Test items:
(1) traction performance at the start
(2) Braking performance during the straight running
(3) Resistance against lateral sliding at the cornering
(4) Irregular wear (whole), particularly shoulder wear, and heel and toe wear The results of the tests are shown in the following Table 1.

TABLE 1

| Tire performance | | Comparative pattern | | | | Sample pattern | | |
|---|---|---|---|---|---|---|---|---|
| | | Rib type (FIG. 4a) | Block type (FIG. 4b) | Rug type (FIG. 4c) | Rib-block type (FIG. 4d) | FIG. 1a | FIG. 2a | FIG. 3a |
| Wet road | Traction Loaded car | 100 | 145 | 95 | 130 | 135 | 143 | 139 |
| | Empty car | 100 | 160 | 75 | 155 | 148 | 158 | 150 |
| | Braking Loaded car | 100 | 140 | 90 | 128 | 130 | 137 | 135 |
| | Empty car | 100 | 135 | 65 | 125 | 120 | 130 | 125 |
| | Cornering Loaded car | 100 | 70 | 65 | 85 | 95 | 97 | 99 |
| | Empty car | 100 | 70 | 65 | 75 | 95 | 98 | 99 |
| Irregular wear | | 100 | 60 | 50 | 70 | 90 | 95 | 99 |

Note:
Performance of rib type pattern is indicated by an index 100. The larger index indicates the more excellent performance.

The above described tests were carried out in the following manner.

(1) Traction performance at the start:
In order to evaluate the resistance against slip, in the straightly running direction of a tire, of frictional force generated between the tire and a wet road surface, a sample tire was fitted to all wheels of four-wheeled automobile, and the car was started at a high acceleration on a wet road having a low $\mu$ value, and the slip ratio measured from the difference between the car speed and the revolution number of the tire under a constant condition of the high acceleration, whereby tires having the tread pattern of the present invention were compared with tires having the conventional tread pattern with respect to the wet traction performance at the start.

(2) Braking performance during the straight running (according to JIS D1013, Test for Brake of Automobile):
A sample tire was braked during the straight running, and the running distance of the tire after the tire was locked was measured, whereby the braking performance of tires having the tread pattern of the present invention were compared with that of tires having the conventional tread pattern.

(3) Resistance against lateral sliding at the cornering:

In order to evaluate the resistance against lateral sliding of frictional force generated between a tire and a wet road surface, a sample tire was fitted to all wheels of four-wheeled automobile, and the car was subjected to a cornering test under a constant condition, whereby the cornering performance of tires having the tread pattern of the present invention were compared with that of tires having the conventional tread pattern by the critical speed for lateral sliding and by the cornering time at the critical speed for lateral sliding.

(4) Irregular wear (whole), particularly shoulder wear, and heel and toe wear:

A driving force and a lateral acceleration were rapidly caused in a sample tire by means of a driving force-variable car, and the wear resistance and irregular wear of the sample tire were measured, and tires having the tread pattern of the present invention were compared with tires having the conventional tread pattern in the wear, shoulder wear, and heel and toe wear.

The present invention is not limited to the above described embodiments, and it is more preferable to satisfy the following conditions in the production of tires having the tread pattern of the present invention.

1. The ridgelines of the edge of the main groove are parallel to each other, and extend over the entire circumference of the tread along the circumference in such a zigzag form that the ridgeline consists of at least 50%, preferably 70-90%, based on the circumferential length of the tread, of the total length of circumferentially directed ridgeline portions connected with each other through inclined ridgeline portions, which form an angle of 30°-80° with the equatorial line of the tread, and that the adjacent circumferentially directed ridgeline portions connected through the inclined ridgeline portion are located apart from each other by a distance of 0.5-5%, preferably 1-3%, based on the width of the tread in its axial direction.

2. The notch has outwardly inclined edges at the outward portion of the tread in the radial direction, and further has parallel ridges extending to the inward portion of the tread in the radial direction from the outwardly inclined edge portion while keeping a constant width smaller than that at the outwardly inclined edge portion.

3. The notches are arranged in a zigzag form between the adjacent groove edges.

4. The notch has a maximum width of 0.7-3% based on the tread width.

5. The notch has preferably a width of 0.5-2% based on the tread width in the inward portion of the tread in the radial direction.

6. The notch has a depth of 5-50%, preferably 10-30%, based on the depth of the main groove connected thereto, at the outwardly inclined edge portion formed in the outward portion of the tread in the radial direction, and has a depth of 50-100%, preferably 70-90%, based on the depth of the main groove, at the deepest portion formed in the inward portion of the tread in the radial direction.

7. The notches are arranged in substantially the same interval along the circumference of the tread.

8. The notch has a largest width at a portion, which is opened to the main groove, among other portions.

9. The deepest portion of the notch has a depth of 50-100% based on the depth of the main groove, to which the notch is opened, and has a length of 10%, preferably 20%, based on the lateral width of the land, on which the notch is arranged.

10. The notch has outwardly inclined edges, which make an angle of 6°-90°, preferably 10°-60°, at the outward portion of the tread in the radial direction.

11. The notch has a depth which changes substantially linearly.

12. The land arranged between a pair of lands located at both side regions of the tread have notches arranged in a pitch larger than the lateral width of the land, preferably not smaller than 1.3 times the lateral width thereof.

13. Sipes having a width remarkably smaller than the opening width of notch are arranged at least at that edge portion of lands located at both side regions of the tread which is faced to the main groove and projected thereto.

14. The tread has a round shape or inclined shape at both side end portions, and at least the round or inclined portion has sipes formed by cutting the portion in the axial direction of the tire at an interval substantially equal to or less than the width of the main groove of the tread.

As described above, the present invention provides a novel and original tread pattern which has not been known. The tread pattern can improve concurrently performances on wet road at both the straight running and the cornering under a low load, particularly no load, of a heavy duty pneumatic tire, which performances have not hitherto been concurrently satisfied, without sacrificing the performances on wet road under normal load.

What is claimed is:

1. A heavy duty penumatic radial tire, comprising; a body reinforcement consisting of a carcass and a belt, an outer rubber layer covering the body reinforcement, and a tread formed by covering the crown portion of the body reinforcement by the outer rubber layer; said carcass consisting of at least one rubberized cord layer having tire cords arranged therein in the substantial radial plane of the tire; said belt consisting of at least two metal cord layers arranged on the outer side of the carcass such that the metal cords in the adjacent cord layers are crossed with each other at a relatively small inclined angle with respect to the equatorial line of the tire; said tread having at least four lands formed thereon and separated from each other by at least three main grooves extending continuously in zigzag form along the circumferential direction of the tread, each groove having a width of 3-10% based on the width of the tread; and said at least four lands having a pair of first group lands which are formed at the outermost sides of the tread and are substantially continuous along the circumferential direction of the tire; notches arranged at least at the edge portions of the lands which edge portions are other than those adjacent to the main grooves defining the above described first group lands, and being opened to the main grooves in an opening width of 0.5-4% in each notch based on the width of the tread such that the land near the center portion of the tread has a shear resistance in circumferential and axial directions less than that of the land near the side portion of the tread, each of a pair of second group lands arranged adjacent to and at the inner side of the main grooves defining the above described first group lands being softer at the inner portion thereof than at the outer portion thereof, and the notch, which is arranged on the second group land and is opened to the main groove adjacent to and at the inner side of the second group land, is increased in its depth from the center portion towards the edge portion of the land and is opened to the main groove.

2. A tire according to claim 1, wherein the main grooves which define the lands extend in such a zigzag form that the groove edge consists of circumferentially directed edge portions, which extend substantially parallel to the equatorial line of the tire in the total length of at least 50% based on the circumferential length of the tread, connected with each other through inclined groove edge portions, which form an angle of 30°-80° with the equatorial line of the tread, and that the adjacent circumferentially directed groove edge portions connected through the inclined groove edge portion are located apart from each other in the axial direction of the tire by a distance of 0.5-5% based on the width of the tread.

3. A tire according to claim 1, wherein the width of the main grooves is 3.5-8% based on the width of the tread.

4. A tire according to claim 1, wherein the notch has edges inclined outwardly towards the tread surface.

5. A tire according to claim 4, wherein the opening width of the outwardly inclined edges of the notch at the tread surface is 0.7-3% based on the tread width.

6. A tire according to claim 4, wherein the notch has an opening width of 0.5-2%, based on the tread with, at the portion other than the outwardly inclined edge portion.

7. A tire according to claim 1, wherein the notches are zigzag arranged between adjacent lands separated from each other by a main groove.

8. A tire according to claim 1, wherein the notches are straight grooves extending transversely across a land.

9. A tire according to claim 7, wherein the notches are zigzag arranged with respect to the bisector of a land.

10. A tire according to claim 9, wherein the notches are independently arranged on both sides of the bisector of a land.

11. A tire according to claim 9, wherein each of the notches is formed of discontinuously connected straight line grooves consisting of a groove, which intersects obliquely the bisector of the land, and grooves arranged on both sides of the oblique groove and connected thereto.

12. A tire according to claim 1, wherein the first group lands have an auxiliary circumferential groove, which is far smaller in the width than the main grooves and is substantially closed at the ground-contact region when the tire is rotated under load.

13. A tire according to claim 5, wherein the notch has an opening width of 0.5-2%, based on the tread width, at the portion other than the outwardly inclined edge portion.

* * * * *